Jan. 27, 1959 R. H. MITCHELL 2,870,446
PILOT'S INSTRUMENT FLYING HOOD
Filed Feb. 16, 1956 2 Sheets-Sheet 1

ROSS H. MITCHELL
*INVENTOR.*

BY *[signature]*
*ATTORNEY*

Jan. 27, 1959   R. H. MITCHELL   2,870,446
PILOT'S INSTRUMENT FLYING HOOD
Filed Feb. 16, 1956   2 Sheets-Sheet 2
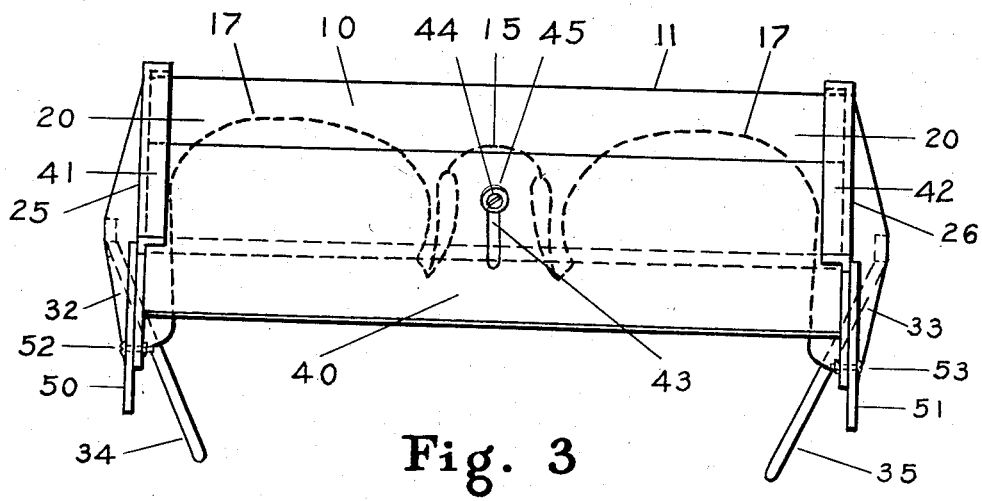
Fig. 3
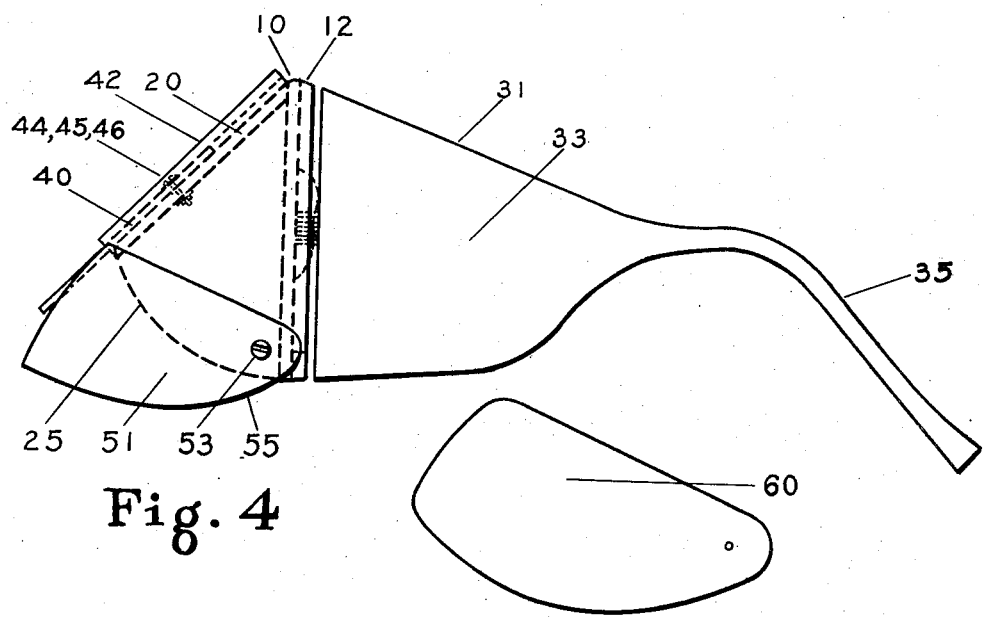
Fig. 4
Fig. 5
ROSS H. MITCHELL
INVENTOR.
BY *Henry T. Horridge*
ATTORNEY

United States Patent Office 2,870,446
Patented Jan. 27, 1959

2,870,446
PILOT'S INSTRUMENT FLYING HOOD

Ross H. Mitchell, Dover, Del.

Application February 16, 1956, Serial No. 565,942

3 Claims. (Cl. 2—12)

This invention relates to a pilot's instrument flying hood which limits the pilot's vision to the scope of the instrument panel of the airship.

The flying hood of this invention comprises a frame, nose piece and temples, a fixed visor and a pair of side masks, a pair of supplemental side shields carried by the temples, a supplemental adjustable visor and a pair of supplemental adjustable side masks.

It is the primary object of my invention to provide an instrument flying hood adequately limiting the pilot's vision to the scope of the instrument panel which may be instantly removed from the pilot's head when required in the interest of safe flying.

It is a further object of my invention to provide such a hood which is comfortable to wear, simple, and inexpensive to manufacture.

Present pilot's instrument flying hoods are cumbersome, heavy and most uncomfortable to wear, causing irritation and fatigue and requiring frequent adjustments.

In instrument flying, emergencies may occur requiring instantaneous removal of the hood and prompt recourse to unrestricted vision. It is not possible to quickly remove the present hoods, and the delay in regaining full vision may, on occasion, be a hindrance to safe flying.

The hood of this invention is positioned and removed as quickly, and worn as comfortably, as a conventional pair of spectacles. Earphones are worn with it when needed in the accustomed manner.

Additionally, it is an excellent sunshield when flying into the sun.

Flying by instruments only must be mastered by the pilot, so that the ability to do so is always at his command. Landing an airship under conditions of no or little visibility may be necessary at unpredictable times. Annual hooded flight tests are required of all military and commercial service pilots.

The hood of this invention by reason of its small size and compactness may always be kept at hand, available for practice use at convenient times during normal flights. Its inexpensiveness will make it available to each individual pilot so that he will not be required to depend upon current equipment which often is not available.

In the drawings:

Fig. 3 is a front elevation of the hood.

Fig. 4 is a side elevation of the hood.

Fig. 5 is a side elevation of a substitute left side supplemental adjustable mask.

Figure 1:
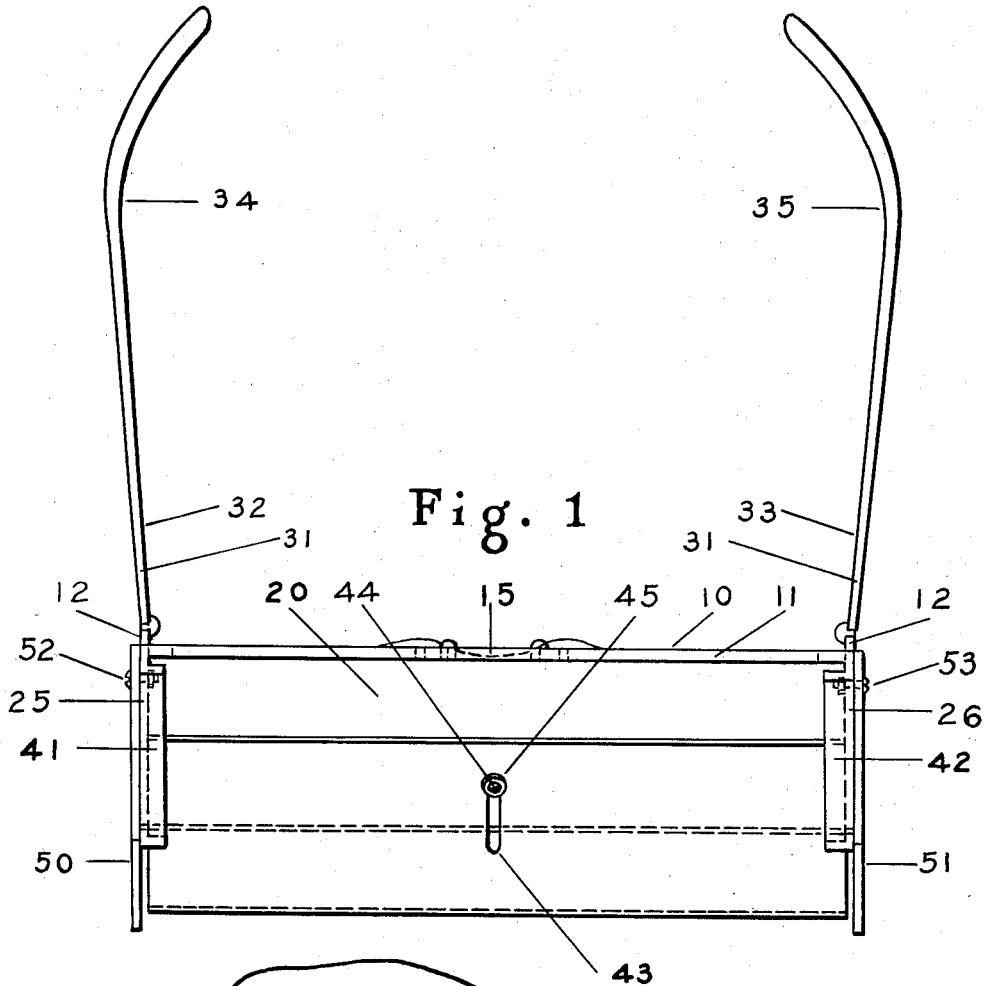
Fig. 1 is a top view of the hood.
Figure 2:
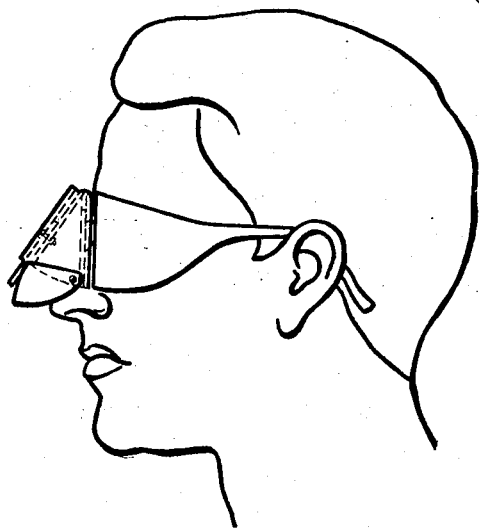
Fig. 2 is a side elevation of the hood in position on the head.

All figures refer to the position of the hood as shown in Fig. 2.

Referring to the drawings:

10 is the frame of the hood, 11 its top, 12 its sides and 15 the nose piece.

Intermediate nose piece 15 and sides 12 of frame 10, its lower edge 17 is curved, generally conforming to the shape of the eyebrows.

20 is the visor and 25, 26 are the side masks, so arranged together as to form an inverted V in cross-section. As shown in the drawings frame 10, visor 20 and side masks 25, 26 are fixedly secured together, but for the purpose of folding the hood, for insertion in a pocket carrying case, hinged or removable connections may be provided.

31 are the temples comprising shield portions 32, 33 and bow portions 34, 35. Temples 30, 31 are hinged, as shown in to the rearward projecting edges of side masks 25, 26 and to the sides of frame 10, but may be otherwise hinged to accomplish the same purpose.

40 is the adjustable visor mounted on visor 20 for vertical adjustment by means of the tracks 41, 42 mounted on visor 20, slot 43 in visor 20 with machine screw 44, washers 45 and nut 46, enabling adjustable visor 40 to be secured at the position desired.

50, 51 are adjustable side masks, pivotally mounted, in the embodiment shown, on side masks 25, 26, by screws 52, 53.

A pilot's instrument flying hood must exclude all vision except that of the scope of the instrument panel.

The masking device must be such that its front lower edge will be registerable with the top of the instrument panel. A variety of conditions require different adjustments to provide such registration. Among them are the following: Some airships do not employ vertically adjustable pilots' seats. Windshields differ in vertical measurement and the relative positions of the pilot seat and windshield may differ.

Adjustable visor 40 may be adjusted so that its lower edge will register with the top of the instrument panel of most types of airships. In exceptional cases a deeper adjustable visor may be substituted.

Differences also occur in the measurements and locations of the side windows of the different types of airships. A deepened windshield calls for deepened side windows forward of the pilot's shoulder. In transports in military service the side windows from abreast of the pilot's left shoulder deepen as they go forward and are higher than the side windows back of his shoulder.

Supplemental adjustable side masks 50, 51 accordingly deepen forwardly and downwardly, their lower edges 55 being formed in a convex curve to exclude all side vision from the lower corner of the windshield back to the aftermost part of the side windows. Side vision above that masked by supplemental adjustable side masks 50, 51 is blocked by side masks 25, 26.

Exceptional conditions of side window measurements and positions may require a larger adjustable left side mask than side masks 50, 51, and such a substitute 60 is shown in Fig. 5. It is not necessary to provide such a substitute for right side masking because the co-pilot, seated to the right of the pilot, blocks off most of the pilot's right side vision. The flight instrument panel is composed of two complete sets of instruments, the left hand set for the pilot and the right hand set for the co-pilot, and there is no need for the pilot to look to the right.

The manner of use of the flying hood of this invention will be apparent from the foregoing description.

It may be made of an opaque, normally non-pliant plastic or of other suitable material. The bows of the temples should be capable of being flexed to fit the ears.

Modification and changes of the embodiment shown may be made without departing from the invention.

I claim:

1. A pilot's instrument-flying hood comprising a fixed rectangular visor, a supplemental visor having a straight lower edge and straight parallel side edges at right angles to said lower edge, slidably mounted on the outer surface of said fixed visor, extending from side to side thereof and downwardly extensible therefrom, means retaining said supplemental visor in selective positions; a fixed side mask of generally triangular shape having a vertical rear edge and a forward edge inclined thereto at an acute angle, mounted on each side of said fixed visor with its apex at the upper edge of said fixed visor and its forward edge extending along and secured to the side of said fixed visor, the acuity of said angle being such as to enable the pilot by extension of said supplemental visor to bring its lower edge into registration, to the eyes of said pilot, with the upper edge of the instrument panel of the airship; a supplemental side mask for each of said fixed side masks supported in parallel, adjacent relationship to said fixed side mask and downwardly extensible therefrom means supporting said supplemental side mask in such relationship to said fixed side mask and permitting its downward extension therefrom said supplemental side mask masking when so extended, the side view below the lower edge of said fixed side mask exposed to said pilot's eyes; a pair of side shields, respectively having vertical forward edges hingedly mounted with said forward edges adjacent to said rear edges of said fixed side masks, extending rearwardly therefrom, and bows rearwardly extending from said last named side shields.

2. A pilot's instrument-flying hood comprising a fixed rectangular visor, a supplemental rectangular visor slidably mounted on the outer surface of said fixed visor, extending from side to side thereof and downwardly extensible therefrom, means guiding such extension and means retaining said supplemental visor in selective positions; a fixed side mask of generally triangular shape having its lower edge convex and having a vertical rear edge and a forward edge inclined thereto at an acute angle, mounted on each side of said fixed visor with its apex at the upper edge of said fixed visor and its forward edge extending along and secured to the side of said fixed visor, the acuity of said angle being such as to enable the pilot by extension of said supplemental visor to bring its lower edge into registration, to the eyes of said pilot, with the upper edge of the instrument panel of the airship; a supplemental side mask of generally triangular shape having its lower edge convex, pivotally mounted on each of said fixed side masks, with one edge forward, downwardly extensible from said fixed mask said supplemental side mask extending from the rear edge of said fixed side mask forwardly to an extent whereby it will substantially abut, when downwardly extended, the path of extension of said supplemental visor below the lower edge of said fixed visor, said supplemental side mask, masking when so extended the side view below the lower edge of said fixed side mask exposed to said pilot's eyes; a pair of side shields respectively having vertical forward edges hingedly mounted with said forward edges adjacent to said rear edges of said fixed side masks, extending rearwardly therefrom, and bows rearwardly extending from said last named side shields.

3. A pilot's instrument-flying hood comprising a rigid frame comprising a top longitudinal frame member having a straight upper edge and a vertical frame member at each end of said longitudinal frame member forming a right angle therewith, a nose-piece forming part of said longitudinal frame member, a rectangular visor secured to said longitudinal member along its top straight edge from end to end thereof, at an acute downwardly diverging angle thereto, a pair of fixed side masks respectively of generally triangular shape having lower convex edges, mounted on the sides of said fixed visor with their apices at the upper edge of said fixed visor their forward edges respectively extending along and secured to the sides of said fixed visor and their rear edges respectively extending along and secured to said vertical frame members, a pair of side shields respectively having vertical forward edges, hingedly mounted on said vertical frame members with their forward edges adjacent to said rear edges of said fixed side masks, said hinged side shields respectively extending rearwardly and terminating in rearwardly extending bows, a supplemental rectangular visor slidably mounted on the outer surface of said fixed visor, extending from side to side thereof and downwardly extensible therefrom, means guiding such extension and means retaining said supplemental visor in selective positions, and a supplemental side mask of generally triangular shape having its lower edge convex, pivotally mounted on each of said fixed side masks near the lower rear corner of the latter, with one edge forward and its apex rearward, downwardly extensible from said fixed side mask, said supplemental side mask extending from the rear edge of said fixed side mask forwardly to an extent whereby it will substantially abut, when downwardly extended, the path of extension of said supplemental visor below the lower edge of said fixed visor, said supplemental side mask when so downwardly extended, masking the side view below the lower edge of said fixed side mask exposed to the pilot's eyes.

References Cited in the file of this patent

UNITED STATES PATENTS

| | | |
|---|---|---|
| 2,293,436 | Kelley | Aug. 18, 1942 |
| 2,506,956 | Gomez | May 5, 1950 |
| 2,556,433 | Mitchell | June 12, 1951 |
| 2,572,656 | Ortenburger | Oct. 23, 1951 |
| 2,616,082 | Creighton | Nov. 4, 1952 |

FOREIGN PATENTS

| | | |
|---|---|---|
| 589,404 | Germany | Dec. 9, 1933 |
| 125,726 | Australia | Oct. 2, 1947 |